United States Patent
Betha et al.

(10) Patent No.: US 12,463,892 B2
(45) Date of Patent: Nov. 4, 2025

(54) AVOIDING MULTICAST TRAFFIC LOSS DURING MAINTENANCE MODE TRANSITION

(71) Applicant: Arista Networks, Inc., Santa Clara, CA (US)

(72) Inventors: Sandeep Betha, Burnaby (CA); Gokul Unnikrishnan, Toronto (CA); Santosh Kumar, Morgan Hill, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 72 days.

(21) Appl. No.: 18/602,824

(22) Filed: Mar. 12, 2024

(65) Prior Publication Data

US 2025/0293969 A1  Sep. 18, 2025

(51) Int. Cl.
*H04L 45/16* (2022.01)
*H04L 45/02* (2022.01)

(52) U.S. Cl.
CPC ............. *H04L 45/16* (2013.01); *H04L 45/02* (2013.01)

(58) Field of Classification Search
CPC ..... H04L 45/02; H04L 45/026; H04L 45/028; H04L 45/16; H04L 45/24; H04L 45/48; H04L 45/52; H04L 45/54; H04L 45/56; H04L 45/563
See application file for complete search history.

(56) References Cited

U.S. PATENT DOCUMENTS

| | | | |
|---|---|---|---|
| 10,498,606 B1* | 12/2019 | Pitta | H04L 45/033 |
| 2019/0028285 A1* | 1/2019 | Cheng | H04L 12/189 |
| 2019/0182182 A1* | 6/2019 | Mishra | H04L 49/25 |
| 2024/0348553 A1* | 10/2024 | Mishra | H04L 45/16 |

* cited by examiner

*Primary Examiner* — Kostas J Katsikis
(74) *Attorney, Agent, or Firm* — Fountainhead Law Group, PC

(57) ABSTRACT

In accordance with the present disclosure, a switch under maintenance indicates to one or more of its neighbors that it will go into maintenance mode. The switch can add a maintenance indicator in a message to the neighbors. This "tagged" message informs the neighbor devices of the switch's intent to go into maintenance mode. After a time subsequent to sending the tagged message, the switch under maintenance advertises a message to the targeted neighbors to divert traffic away from itself. The neighbor computes a new path while at the same time continuing to receive traffic on the old path. Graceful switchover occurs when the neighbor sees traffic on the new path and, in response, stops traffic on the old path without losing traffic.

20 Claims, 4 Drawing Sheets

AVOIDING MULTICAST TRAFFIC LOSS DURING MAINTENANCE MODE TRANSITION

BACKGROUND

The present disclosure is directed to maintenance mode operation in a network device (e.g., switch, router). Conventionally, when a device goes into maintenance mode, it advertises a routing update message to its neighbors to divert traffic away from itself. Generally, when a neighbor receives the routing update message, the neighbor removes existing (old) paths from its routing information base (RIB) that include the device. More particularly, a neighbor that is sending multicast traffic to the device under maintenance will stop sending multicast traffic to that device. Any residual traffic buffered in that neighbor will be dropped, resulting in loss of traffic. Likewise, a neighbor that is receiving multicast traffic from the device under maintenance will: (1) tell the device to stop sending traffic; and (2) look for an alternate route to receive the multicast traffic. When the device under maintenance receives the message to stop sending traffic from the neighbor, any residual traffic buffered in the device will be dropped, resulting in loss of traffic.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

Figure 1:
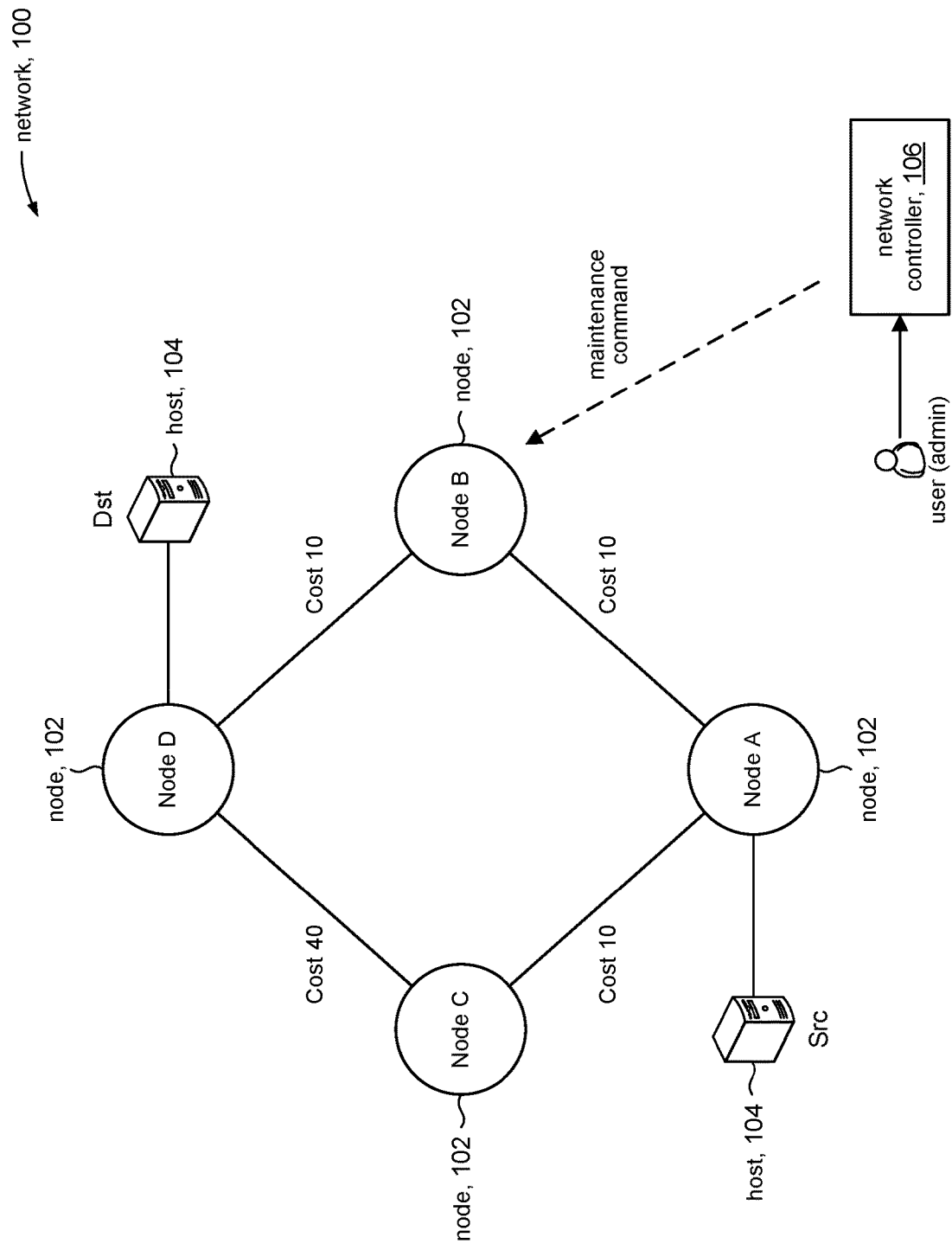
FIG. 1 shows an example network for illustrating aspects of the present disclosure.

The present disclosure is explained in the context of a multicast routing protocol referred to as Protocol-Independent Multicast (PIM), and in particular to a variant called PIM Sparse Mode (PIM-SM). It will be understood, however, that the techniques disclosed herein can be adapted for use with other multicast protocols.

In accordance with an aspect of the present disclosure, a device (e.g., switch, router) under maintenance indicates to its neighbors that it will go into maintenance mode. The device under maintenance can send a PIM Hello message tagged with a "maintenance" indicator in one of the type, length, value (TLV) option fields of the Hello message. The device under maintenance can start a timer.

This "tagged" Hello message can be transmitted to every neighbor if the entire device is going to be put into maintenance mode. If only certain interfaces are going into maintenance mode, the tagged Hello message can be transmitted only on those interfaces, targeting only the neighbors connected to those interfaces. In some embodiments, two or more consecutive tagged Hello messages can be transmitted to ensure that at least one tagged Hello message reaches the neighbors.

The tagged Hello message informs the neighbors that the device under maintenance intends to divert traffic away from itself, allowing the neighbor to take action in accordance with the present disclosure when it receives a routing path update message. When the neighbor receives the PIM Hello message with the maintenance option, it simply sets up the necessary state to perform a graceful path switchover for when it gets a routing path update.

When the timer runs out, the device under maintenance will send a routing path update to its neighbors informing the neighbors that it is no longer a preferred route for traffic. In response to the routing path update, a neighbor that receives traffic from the device under maintenance can compute a new alternate path(s) to receive traffic from a multicast source that does not include the device under maintenance, while at the same time continuing to receive and send any final traffic that is buffered in the device under maintenance on the existing (old) path. The neighbor will tell the device under maintenance to stop sending traffic when the alternate path is computed. Because the neighbor is now receiving traffic from the source on the alternate path, any residual packets buffered in the device under maintenance can be dropped without risk of traffic loss.

In the context of the present disclosure, "maintenance mode" can serve as a catch-all phrase to refer to any activity on the device or on certain interface(s) on the device where the device or those interface(s) are not transmitting or receiving packets. Such activity can include upgrades, repair, troubleshooting, and so on.

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

FIG. 1 is a high level diagram illustrating a data network 100 that can embody the techniques in accordance with the present disclosure. Data network 100 comprises nodes 102 and host machines 104. Nodes 102 can be network devices such as switches, routers, etc. Host machines 104 can be sources of traffic (e.g., servers) and receivers of traffic (e.g., client devices). The cost associated with sending packets between pairs of nodes 102 can be any metric associated with transmitting packets between two nodes, and can be computed based on any suitable criteria such as data rate, latency, and so on.

In accordance with some embodiments, network 100 can be configured for multicast streaming. For example, one host can be a source (Src) of traffic that is streamed to multiple destinations, although the figure illustrates a single destination host Dst to avoid making the example unnecessarily complex. Nodes 102 can manage the routing of packets of a multicast stream among themselves using any suitable multicast routing protocol. For discussion purposes, the present disclosure will be explained in the context of a known multicast routing protocol referred to as Protocol- Independent Multicast (PIM), and in particular to a variant called PIM Sparse Mode (PIM-SM). It will be understood, however, that the techniques disclosed herein can be adapted for use with other multicast protocols.

Based on the cost metrics shown in FIG. 1, traffic from Src to Dst will traverse the following path:

Src→node A→node B→node D→Dst

When a node 102 (e.g., node B) is placed in maintenance mode, that node can divert traffic from itself by sending advertisements to its neighbors so that the neighbors will compute new routes that do not transit the node under maintenance. Node B, for example, can be placed in maintenance mode by way of a network controller 106 in response to a command from a user such as a network administrator. Maintenance mode can be used to upgrade the node, troubleshoot the node, and so on. In the context of the present disclosure, a node, or specified interfaces of the node, in maintenance mode is not able to receive and forward traffic.

Figure 2:
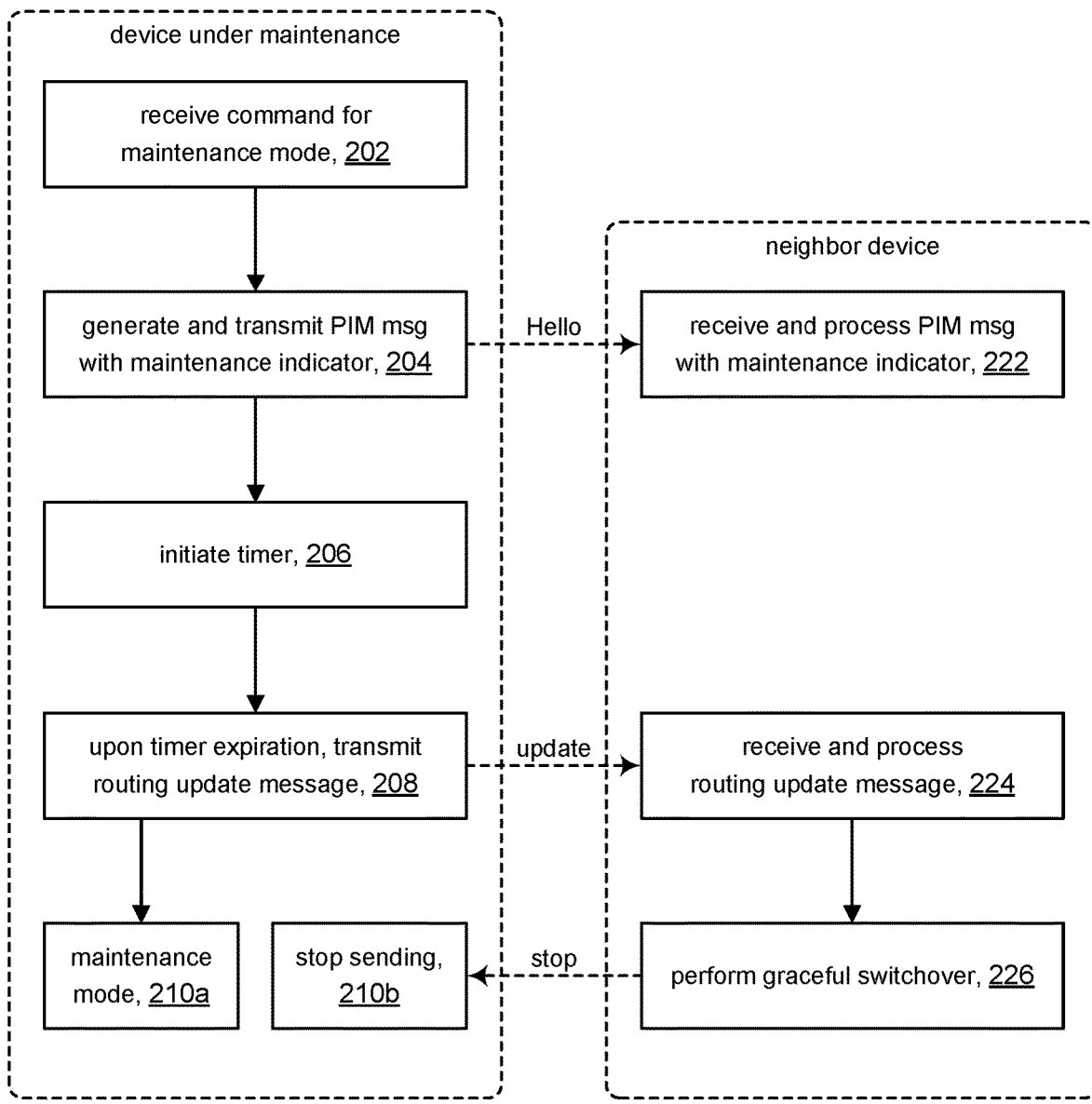
FIG. 2 shows processing in a node (network device) under maintenance in accordance with some embodiments of the present disclosure.

Referring to FIG. 2, the discussion will now turn to a high-level description of processing in a network device (e.g., nodes 102, FIG. 1) for receiving and processing a command to enter maintenance mode in accordance with the present disclosure. Depending on a given implementation, the processing may be performed entirely in the control plane of the network device or entirely in the data plane of the network device, or the processing may be divided between the control plane and the data plane. In some embodiments, the network device can include one or more processing units (circuits), which when operated, can cause the network device to perform processing in accordance with FIG. 2. Processing units (circuits) in the control plane, for example, can include general CPUs that operate by way of executing computer program code stored on a non-volatile computer readable storage medium (e.g., read-only memory); e.g., CPU 408 in the control plane (FIG. 4) can be a general CPU. Processing units (circuits) in the data plane can include specialized processors such as digital signal processors, field programmable gate arrays, application specific integrated circuits, and the like, that operate by way of executing computer program code or by way of logic circuits being configured for specific operations. For example, each of the packet processors 412a-412p in the data plane (FIG. 4) can be a specialized processor. The operation and processing blocks described below are not necessarily executed in the order shown. Operations can be combined or broken out into smaller operations in various embodiments. Operations can be allocated for execution among one or more concurrently executing processes and/or threads.

Reference will be made with the example configuration shown in FIG. 1, where we will consider processing in node B when it enters maintenance mode; node B is the device under maintenance. The operations will be explained with respect to node B, although it will be understood that the operations apply to other network devices in the network.

For discussion purposes, we can assume without loss of generality, that initially the Src is streaming multicast traffic to Dst. Based on the cost metrics shown in FIG. 1, multicast traffic from Src to Dst will traverse the path:

Src→node A→node B→node D→Dst

At operation 202, node B (i.e., network device under maintenance) can receive a maintenance mode command that places the network device in maintenance mode. In the context of the present disclosure, maintenance mode refers to a mode of operation where the network device will no longer receive or forward traffic, but is otherwise operable for example to interact with a user to perform maintenance activity on the network device. In some embodiments, the maintenance mode command can be entered by a user; for example, via a command line interface on the network device. In other embodiments, the maintenance mode command can originate from a network controller (e.g., network controller 106).

Figure 3:
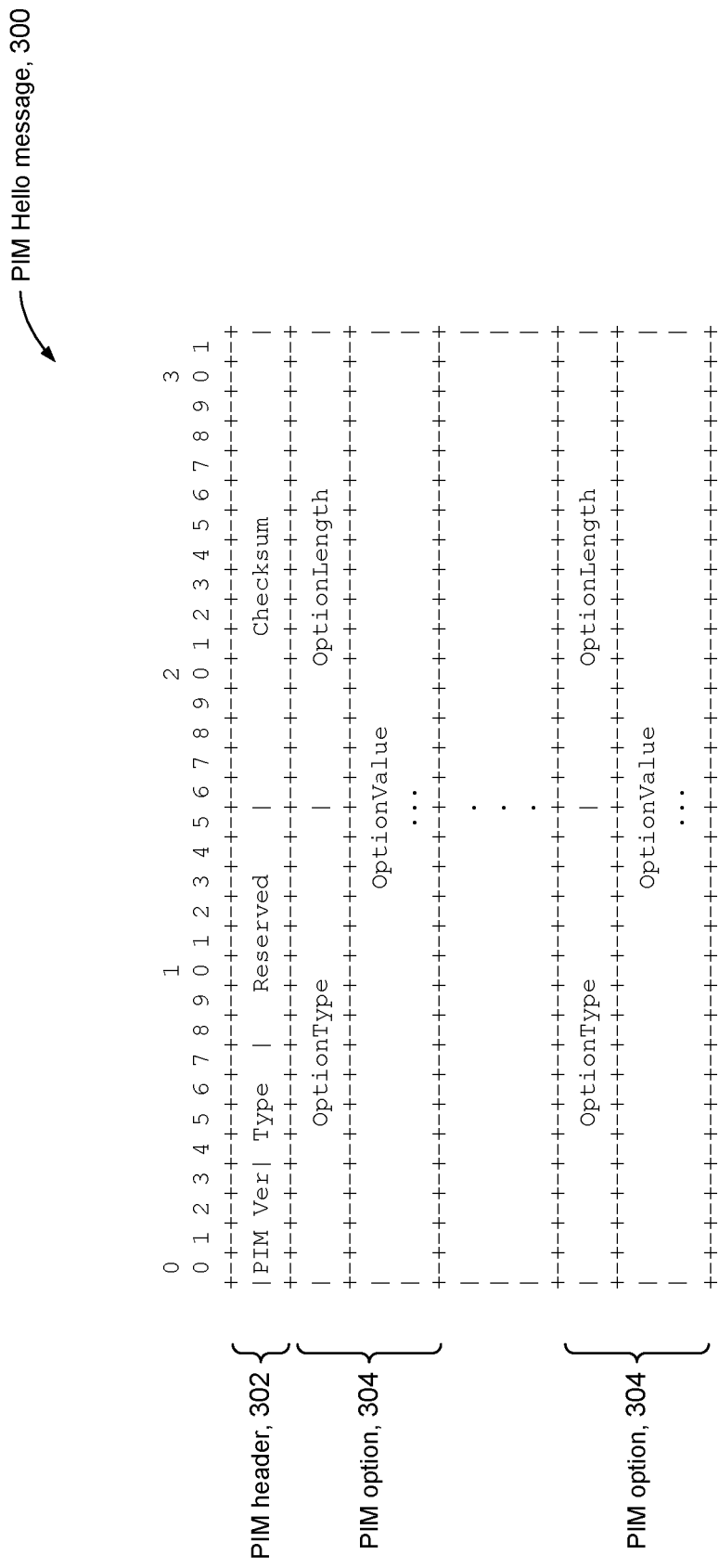
FIG. 3 shows the format of a PIM Hello message.

At operation 204, node B can generate and transmit a PIM message in response to receiving the maintenance mode command. In accordance with some embodiments, the generated PIM message can be the PIM Hello message, although it will be appreciated that any suitable kind of message can be used. Referring for a moment to FIG. 3, the format of a PIM Hello message 300 includes a PIM header 302 comprising PIM Version, Type, Reserved, and Checksum data fields, and one or more PIM option data fields 304, each comprising OptionType, OptionLength, and Option Value data subfields.

In accordance with some embodiments of the present disclosure, one of the PIM options 304 in the PIM Hello message can be set to a "maintenance" option. For example, the data fields of the maintenance option can be set to any suitable, predefined values; e.g., OptionType=65000, OptionLength=8, Optionvalue=1. The maintenance option serves to indicate to the recipient of the PIM Hello message that the sender of the PIM Hello message will be going into maintenance mode.

In some embodiments, two or more of the PIM Hello messages can be sent in succession, for example, spaced a couple of seconds apart. The redundant transmission serves to ensure that the neighbors of node B receive the PIM Hello message. In some embodiments, where the entire device is placed in maintenance mode, in which case the PIM Hello message can be transmitted to every neighbor connected to the device. In other embodiments, where the maintenance command is directed only to certain ports on the device, the PIM Hello message can be transmitted only to neighbors connected to the targeted ports.

Node B can transmit the PIM Hello message to its neighbors, namely node A and node D. In accordance with the present disclosure, the PIM message informs the neighbors of node B, namely node A and node D, that node B will be going into maintenance mode. Accordingly, in some embodiments, in response to receiving the PIM message, the neighbor (at operation 222) can internally "mark" that the sender (node B in our example) of the PIM message is going to go into maintenance. The PIM message with the maintenance option serves as a notification to notify or otherwise indicate to the neighbor that the sender of the PIM message will go into maintenance. The PIM message does not affect current processing in the neighbor; the neighbor will continue sending/receiving traffic to/from the sender. For example, node A will mark node B to indicate that it will go into maintenance mode, but will otherwise continue sending multicast traffic from Src to node B. Node D, likewise, will mark node B but will otherwise continue to receive and forward traffic from node B.

At operation 206, node B can start a timer. The timer serves to delay node B in when to send a route update message to its neighbors to give the neighbors time to set up necessary state to perform a graceful switchover. In some embodiments, for example, the timer can run for 60 seconds, although the timer can be set to run for any suitable amount of time. As explained above, during the period that the timer is running in node B, node D and node A continue to send/receive multicast traffic via node B.

At operation 208, when the timer expires, node B can transmit a routing path update message to its neighbors (e.g., node A and node D) that indicates node B is no longer a preferred route for multicast traffic for the purpose of diverting traffic away from itself. In some embodiments, for example, node B can advertise an increased cost metric for itself using a unicast routing protocol (e.g. Border Gateway Protocol, BGP), although any suitable message can be used. The routing path update message can cause the neighbors to compute new paths that do not transit node B.

Accordingly, in some embodiments, in response to receiving the routing path update message, the neighbor (at operation 224) can compute a new path. However, in the case of a neighbor that is sending traffic to node B (e.g., node A), the neighbor does not need to recompute any paths. As will be explained below, node A will just eventually stop sending traffic to node B because node B will stop "asking" for traffic from node A (because node D starts asking node C, instead of node B, to ask node A).

On the other hand, if a neighbor (e.g., node D) is getting multicast traffic from the Src via node B, the neighbor (at operation 224) in response to receiving the routing path update can compute an alternate path that does not transit the device under maintenance, while still receiving traffic through the existing path. Node D, for example, can begin computing a new path to get multicast traffic from the Src that does not transit node B. For example, node D can generate a PIM Join message and send it to node C. Node C can send the PIM Join message to node A. Node A then gets multicast traffic from Src and sends it back, in reverse order of the way the PIM Join messages were received, to node C. The destination (Dst) can receive traffic along the following new paths:

Src→node A→node C→node D→Dst

Moreover, in accordance with the present disclosure, because node D had previously marked node B in response to having received the PIM Hello message (operation 222), node D continues to receive and forward multicast traffic that originates from Src via node B while it is computing the new path(s). In this way, multicast traffic from Src to Dst on the old path that includes node B remains uninterrupted.

Processing in node D continues at operation 226, where node D can perform a graceful switchover. Node D can detect or otherwise determine traffic is flowing on the new path when node D sees packets arriving from a neighbor on the new path. In response to detecting multicast traffic on the new path, node D checks to see if the old path is from a neighbor (e.g., node B) that has been marked (per operation 222) as going into maintenance. If so, node D can send a stop-sending message (e.g., the PIM Prune message) to node B, telling node B to stop sending multicast traffic to node D. Because multicast traffic from Src has been detected on the new path, node D can tell node B to stop sending its multicast traffic without risk of Dst experiencing traffic loss.

At operation 210a, node B can safely enter maintenance mode at this point because the switchover from node B to the new paths has completed.

At operation 210b, in response to node B receiving a stop-sending message from node D, node B stops sending multicast traffic to node D. Any residual packets in node B not yet sent to node D will be dropped; the residual traffic will not be sent to Dst. However, because node D is receiving multicast traffic on the new path, any packets dropped by node B will already be supplied from the multicast traffic transmitted along the alternate path. This make-before-break processing ensures a lossless switch from node B to the alternate path. The alternate paths are identified (make) before node B is told to stop sending multicast traffic (break).

Because node B stops sending multicast traffic to node D, node B will determine that it has no more recipients (e.g., Dst) of the multicast traffic. In response to node B determining that it has no more recipients, node B can tell node A to stop sending multicast traffic to node B.

Comparison to Conventional (Prior Art) Technique

Prior art technique for a node (e.g., node B) transitioning into maintenance mode involves:
a. Node B intends to go into maintenance mode.
b. Node B sends routing path updates to its neighbors, namely node A and D. These updates tell the neighbors that node B is no longer a preferred route for traffic.
c. The nodes do the following after receiving the routing path update:
  Node D tells node B to stop sending traffic. Node B stops sending traffic and any residual multicast packets from node B are dropped.
  Node B stops asking node A to send it traffic since it has no more receivers (i.e., Dst), and in response node A stops sending traffic to node B.
d. Node D looks for alternate paths to get traffic from the Src.

It can be seen that at step c, when node D tells node B to stop sending traffic, node D has not yet begun to compute an alternate path for getting traffic from the Src. The computation of an alternate path occurs at step d, after node D tells node B to stop sending traffic. Consequently, when node B drops its residual packets, Dst will not receive the dropped packets.

Processing of the transition to maintenance mode in accordance with the present disclosure can be summarized as:
a. Node B intends to go into maintenance mode.
b. Node B sends PIM Hello messages with the "maintenance" option as one of the options to neighbor nodes A and D, and starts a timer.
  The PIM Hello message informs nodes A and D to set up appropriate state for graceful switchover after receiving a routing path update; e.g. locally mark node B as going into maintenance.
  Nodes A and D continue to transmit/receive to/from the old path, which includes node B.
c. At timeout, node B sends routing path updates to all connected routers (i.e. node A, and D). These updates tell the other routers that node B is no longer a preferred route for traffic.
d. The nodes do the following in response to receiving the routing path update:
  The routing path update triggers node D to compute alternate paths to get traffic from the Src while still receiving residual multicast traffic from node B (make-before-break).
  Node D performs a graceful switchover:
    When node D detects traffic on the alternate path, node D tells node B to stop sending traffic.
    Node B stops sending traffic to node D, and any residual multicast packets from node B are dropped. The dropped packets can be replaced in the traffic on the new path.
    Node B stops asking node A to send it traffic since it has no more receivers (i.e., Dst), and in response node A stops sending traffic to node B.

We can see that by the time node B is told to stop sending packets to node D, and hence drops its residual packets, node D will have already computed alternate paths to the Src and be receiving traffic on the alternate paths, so the dropped packets can be replaced with the same packets in the traffic on the alternate paths, thus avoiding traffic loss. The switchover from the old path to the new path is "graceful" in that the switchover occurs without traffic loss.

Figure 4:
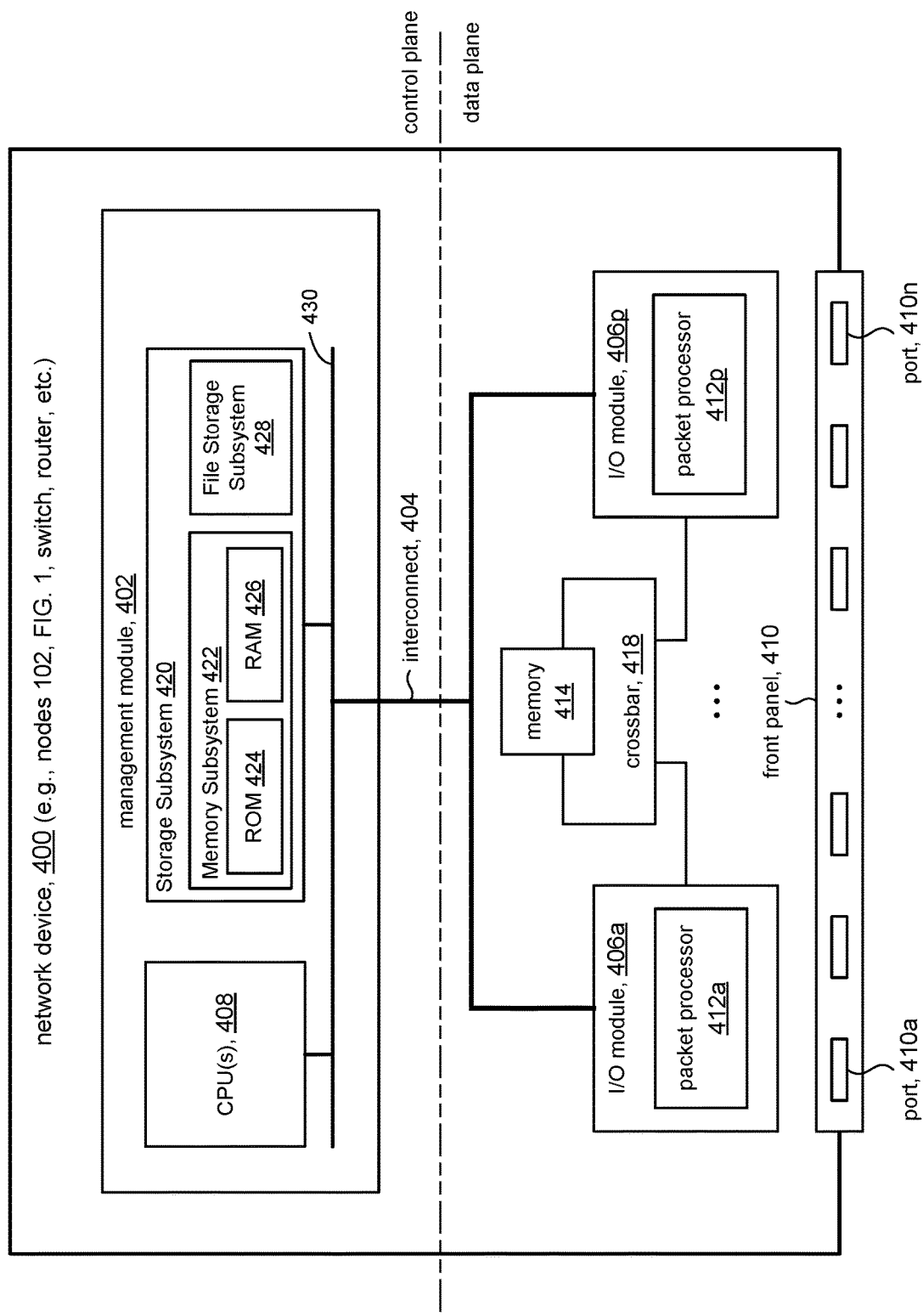
FIG. 4 shows details of a network device that can be adapted in accordance with some embodiments of the present disclosure.

FIG. 4 is a schematic representation of a network device 400 (e.g., a router, switch, firewall, and the like) that can be adapted in accordance with the present disclosure. In some embodiments, for example, network device 400 can include a management module 402, one or more I/O modules (switches, switch chips) 406a-406p, and a front panel 410 of I/O ports (physical interfaces, I/Fs) 410a-410n. Management module 402 can constitute the control plane of network device 400 (also referred to as the control layer or simply the central processing unit, CPU), and can include one or more CPUs 408 for managing and controlling operation of network device 400 in accordance with the present disclosure. Each CPU 408 can be a general-purpose processor, such as an Intel®/AMD® x86, ARM® microprocessor and the like, that operates under the control of software stored in a memory device/chips such as read-only memory (ROM) 424 or random-access memory (RAM) 426. The control plane provides services that include traffic management functions such as routing, security, load balancing, analysis, and the like.

The one or more CPUs 408 can communicate with storage subsystem 420 via bus subsystem 430. Other subsystems, such as a network interface subsystem (not shown in FIG. 4), may be on bus subsystem 430. Storage subsystem 420 can include memory subsystem 422 and file/disk storage subsystem 428. Memory subsystem 422 and file/disk storage subsystem 428 represent examples of non-transitory computer-readable storage devices that can store program code and/or data, which when executed by one or more CPUs 408, can cause one or more CPUs 408 to perform operations in accordance with embodiments of the present disclosure.

Memory subsystem 422 can include a number of memories such as main RAM 426 (e.g., static RAM, dynamic RAM, etc.) for storage of instructions and data during program execution, and ROM (read-only memory) 424 on which fixed instructions and data can be stored. File storage subsystem 428 can provide persistent (i.e., non-volatile) storage for program and data files, and can include storage technologies such as solid-state drive and/or other types of storage media known in the art.

CPUs 408 can run a network operating system stored in storage subsystem 420. A network operating system is a specialized operating system for network device 400. For example, the network operating system can be the Arista EOS® operating system, which is a fully programmable and highly modular, Linux-based network operating system developed and sold/licensed by Arista Networks, Inc. of Santa Clara, California. It is understood that other network operating systems may be used.

Bus subsystem 430 can provide a mechanism for the various components and subsystems of management module 402 to communicate with each other as intended. Although bus subsystem 430 is shown schematically as a single bus, alternative embodiments of the bus subsystem can utilize multiple buses.

The one or more I/O modules 406a-406p can be collectively referred to as the data plane of network device 400 (also referred to as the data layer, forwarding plane, etc.). Interconnect 404 represents interconnections between modules in the control plane and modules in the data plane. Interconnect 404 can be any suitable bus architecture such as Peripheral Component Interconnect Express (PCIe), System Management Bus (SMBus), Inter-Integrated Circuit (I$^2$C), etc.

I/O modules 406a-406p can include respective packet processing hardware comprising packet processors 412a-412p (collectively 412) to provide packet processing and forwarding capability. Each I/O module 406a-406p can be further configured to communicate over one or more ports 410a-410n on the front panel 410 to receive and forward network traffic. Packet processors 412 can comprise hardware (circuitry), including for example, data processing hardware such as an application specific integrated circuit (ASIC), field programmable gate array (FPGA), processing unit, and the like, which can be configured to operate in accordance with the present disclosure. Packet processors 412 can include forwarding lookup hardware such as, for example, but not limited to content addressable memory such as ternary CAMs (TCAMs) and auxiliary memory such as static RAM (SRAM).

Memory hardware 414 can include buffers used for queueing packets. I/O modules 406a-406p can access memory hardware 414 via crossbar 418. It is noted that in other embodiments, the memory hardware 414 can be incorporated into each I/O module. The forwarding hardware in conjunction with the lookup hardware can provide wire speed decisions on how to process ingress packets and outgoing packets for egress. In accordance with some embodiments, some aspects of the present disclosure can be performed wholly within the data plane.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method performed by a network device, the method comprising the network device:

receiving traffic from a first neighbor device and sending the traffic to a second neighbor device, the traffic originating from a source;

receiving a maintenance command to go into a maintenance mode of operation;

in response to receiving the maintenance command, generating a Protocol Independent Multicast (PIM) message that includes a maintenance indication code;

transmitting the PIM message to neighbors of the network device, including the first neighbor device and the second neighbor device, wherein each of the first and second neighbor devices marks the network device as going into maintenance mode;

initiating a timer subsequent to transmitting the PIM message; and in response to expiration of the timer, transmitting a route update message to the neighbors of the network device to redirect traffic away from the network device, including the first and second neighbor devices, wherein in response to receiving the route update message:

the first neighbor stops sending traffic to the network device, and the network device stops sending traffic to the second neighbor.

2. The method of claim 1, wherein the second neighbor device, in response to receiving the route update message (1) begins computing a new path from the source that does not include the network device and, in response to the second neighbor device having marked the network device as going into maintenance mode, (2) continues to receive traffic from the network device and forwarding the received traffic while computing the new path.

3. The method of claim 2, wherein the second neighbor device detects traffic on the new path and in response to detecting the new traffic transmits a stop sending message to the network device, wherein the network device stops sending traffic to the second neighbor device and drops any buffered traffic intended for, but not yet sent to, the second neighbor.

4. The method of claim 3, wherein the network device, in response to receiving the stop sending message, transmits a stop sending message to the first neighbor.

5. The method of claim 1, wherein the PIM message is a PIM Hello message and the maintenance indication code is an option field of the PIM Hello message.

6. The method of claim 1, wherein the maintenance command is directed to only some of the interfaces on the network device, wherein the PIM message and the route update message are transmitted on each of the interfaces targeted by the maintenance instruction.

7. The method of claim 1, wherein transmitting the PIM message to neighbors of the network device includes transmitting the PIM message to the neighbors of the network device one or more additional times.

8. A network device comprising:
one or more computer processors; and
a computer-readable storage device comprising instructions for controlling the one or more computer processors to:
receive traffic from a first neighbor device and send the traffic to a second neighbor device, the traffic originating from a source;
receive a maintenance command to go into a maintenance mode of operation; and
in response to receiving the maintenance command, transmit (1) a notification to at least the first and second neighbor devices and, after a period time, (2) a route update message to the first and second neighbor devices to redirect traffic away from the network device,
wherein in response to receiving the route update message the first neighbor stops sending traffic to the network device and the network device stops sending traffic to the second neighbor.

9. The network device of claim 8, wherein the second neighbor device, in response to receiving the route update message (1) begins computing a new path from the source that does not include the network device and (2) continues to receive traffic from the network device and forwarding the received traffic concurrently with computing the new path by virtue of having previously received the notification.

10. The network device of claim 9, wherein the second neighbor device detects traffic on the new path and in response to detecting the new traffic transmits a stop sending message to the network device, wherein the network device stops sending traffic to the second neighbor device and drops any buffered traffic intended for the second neighbor but not yet sent.

11. The network device of claim 10, wherein the network device, in response to receiving the stop sending message, transmits a stop sending message to the first neighbor.

12. The network device of claim 8, wherein the maintenance instruction is directed to only some of the interfaces on the network device, wherein the notification and the route update message are transmitted on each of the interfaces targeted by the maintenance instruction.

13. The network device of claim 8, wherein transmitting the notification to the first and second neighbor devices includes transmitting the notification to the first and second neighbor devices one or more additional times.

14. The network device of claim 8, wherein the notification is a Protocol Independent Multicast (PIM) Hello message that contains a maintenance indication code is an option field of the PIM Hello message.

15. A non-transitory computer-readable storage device in a network device, the non-transitory computer-readable storage device having stored thereon computer executable instructions, which when executed, cause the network device to:
receive traffic from a first neighbor device and send the traffic to a second neighbor device, the traffic originating from a source;
receive a maintenance command to go into a maintenance mode of operation; and
in response to receiving the maintenance command, transmit (1) a notification to at least the first and second neighbor devices and, after a period time, (2) a route update message to the first and second neighbor devices to redirect traffic away from the network device,
wherein in response to receiving the route update message the first neighbor stops sending traffic to the network device and the network device stops sending traffic to the second neighbor.

16. The non-transitory computer-readable storage device of claim 15, wherein the second neighbor device:
in response to receiving the route update message, begins computing a new path from the source that does not include the network device; and
in response to having previously received the notification, continues to receive traffic from the network device and forwarding the received traffic while computing the new path.

17. The non-transitory computer-readable storage device of claim 15, wherein the second neighbor device detects traffic on the new path and in response to detecting the new traffic transmits a stop sending message to the network device, wherein the network device stops sending traffic to the second neighbor device and drops any buffered traffic intended for the second neighbor but not yet sent.

18. The non-transitory computer-readable storage device of claim 15, wherein the maintenance instruction is directed to only some of the interfaces on the network device, wherein the notification and the route update message are transmitted on each of the interfaces targeted by the maintenance instruction.

19. The non-transitory computer-readable storage device of claim 15, wherein transmitting the notification to the first and second neighbor devices includes transmitting the notification to at least the first and second neighbor devices one or more additional times.

20. The non-transitory computer-readable storage device of claim 15, wherein the notification is a Protocol Independent Multicast (PIM) Hello message that contains a maintenance indication code is an option field of the PIM Hello message.

* * * * *